United States Patent [19]

Huber

[11] Patent Number: 4,859,322

[45] Date of Patent: Aug. 22, 1989

[54] DEVICE FOR REMOVING MATERIAL SCREENED OR FILTERED OUT OF A LIQUID FLOWING IN A CHANNEL

[76] Inventor: Hans G. Huber, Zum Rachental 8, 8434 Berching, Fed. Rep. of Germany

[21] Appl. No.: 136,835

[22] Filed: Dec. 22, 1987

[30] Foreign Application Priority Data

May 16, 1987 [DE] Fed. Rep. of Germany ....... 3716434

[51] Int. Cl.⁴ .................... B01D 35/02; E02B 5/08; E02B 8/02; E03F 5/14
[52] U.S. Cl. ..................................... 210/162; 210/415
[58] Field of Search ............... 210/155, 158, 159, 162, 210/415; 100/117, 145

[56] References Cited

U.S. PATENT DOCUMENTS

| 689,440 | 12/1901 | Tuska | 210/415 |
| 1,096,199 | 5/1914 | Schuyler | 100/145 |
| 2,491,912 | 12/1949 | Walker | 210/415 |
| 2,929,504 | 3/1960 | Lind et al. | 210/162 |
| 3,688,687 | 9/1972 | Craig et al. | 100/117 |
| 3,695,173 | 10/1972 | Cox | 100/117 |
| 4,424,129 | 1/1984 | Bunger | 210/415 |

FOREIGN PATENT DOCUMENTS

| 524160 | 3/1956 | Belgium | 100/145 |
| 2142540 | 3/1973 | Fed. Rep. of Germany . | |
| 213353 | 9/1984 | German Democratic Rep. | 210/396 |
| 1256992 | 9/1986 | U.S.S.R. | 100/117 |

Primary Examiner—Richard V. Fisher
Assistant Examiner—Linda S. Evans
Attorney, Agent, or Firm—Max Fogiel

[57] ABSTRACT

A device for removing material screened or filtered out of a liquid flowing in a channel. It consists of an unpowered cylindrical grating that merges into a screw-type conveyor. The grating slants down, partly immersed in the liquid, to the bottom of the channel. The bars of the grating extend over its total length leaving longitudinal interstices between them. The upward-sloping conveyor comprises a housing, a shaft, and a worm and conveys the screened-out material to a depositing point. The worm picks up the screened-out material as it scrapes the bars of the grating and conveys the material upward, constantly keeping the grating clean. The grating bars (8) are more or less triangular or trapezoidal in cross-section, with rounded-off edges, and positioned in such a way that one side (25) of the triangular or trapezoidal cross-section is oriented tangential to the circumference of the conveyor worm (16). The longitudinal interstice (10) is narrowest at the least possible radius at that point, adjacent to which its open cross-section (28) expands over-proportionally in the direction (32) traveled by the liquid. The grating bars that demarcate the longitudinal interstices are connected by outside bracing bars (9).

15 Claims, 3 Drawing Sheets

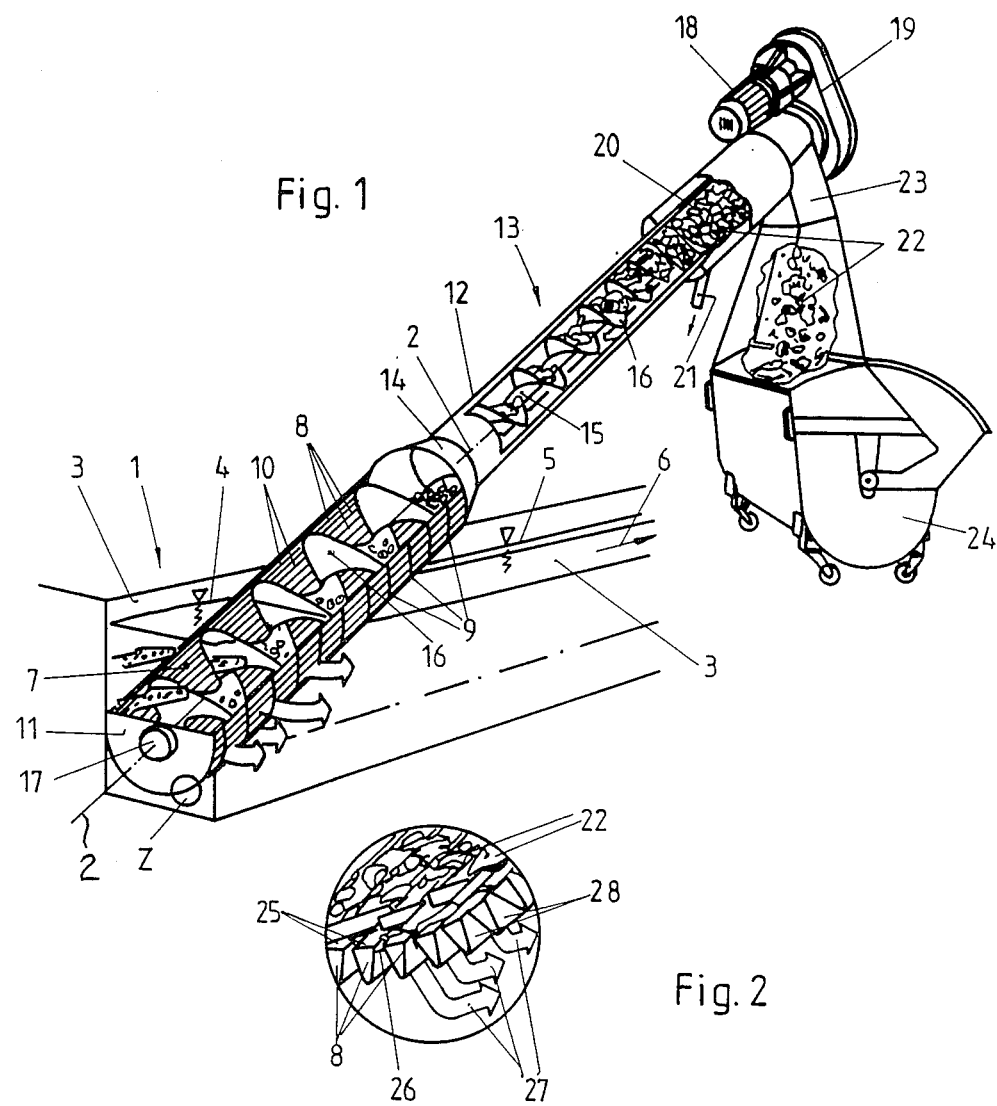

DEVICE FOR REMOVING MATERIAL SCREENED OR FILTERED OUT OF A LIQUID FLOWING IN A CHANNEL

BACKGROUND OF THE INVENTION

The invention concerns a device for removing material screened or filtered out of a liquid flowing in a channel, consisting of an unpowered cylindrical grating that slants down, partly immersed in the liquid, to the bottom of the channel, with the bars of the grating extending over its total length leaving longitudinal interstices between them, and that merges into an upward-sloping section in the form of a screw-type conveyor that comprises a housing, a shaft, and a worm and conveys the screened-out material to a depositing point, whereby the worm picks up the screened-out material as it scrapes the bars of the grating and conveys the material upward, constantly keeping the grating clean. Although the device is especially intended for water-treatment plants, it can also be employed in a practical way in other fields of technology, in the textile and plastics industries, etc., for example. The device is especially practical when employed with narrow channels, 100 to 500 mm wide, and/or when the interstices between the bars must be narrow in order to pick up and remove fine material.

A device of this kind is known from German OS 2, 142 540. It consists essentially of a screw conveyor, housing shaft, and worm, with a motor mounted on top that transmits its rotation to the shaft and hence to the worm. The lower section of the conveyor housing, where it is immersed in the liquid, is completely occupied by the grating, which consists of bars that extend over its total length with longitudinal interstices between time, parallel to the axis of the shaft, and along its cylindrical surface. The grating bars are not braced transversely inside the grating and are essentially rectangular in cross-section, with the longer sides of the rectangle extending radially outward from the shaft. There are several drawbacks to bars, and to the interstices between them where the screened-out material precipitates, that are designed in this way. First, the bars are comparatively unstable, and it is difficult to position them precisely enough to ensure that the worm will come into contact with as many points as possible on the inner surface of the grating as it rotates against it. It is in fact only where such contact occurs that the deposited material will be entrained. Where there is no contact, the material can accumulate and clog up the grating, detrimentally increasing its hydraulic resistance. Furthermore, once the material has accumulated to a certain thickness, the rotating worm can eventually force it back out through the interstices into the filtered water, destroying the function of the grating at that point. This possibility increases with the physical and structural instability of the bars to the extent that they will resiliently bend out radially subject to the force of the worm, increasing the width of the interstices. When, as at this state of the art, the longer side of the rectangular cross-section of the bar extends radially outward, the moment of resistance to the outward bending that increases the width of the interstices is especially deleterious. Furthermore, since the open cross-section expands only in proportion to the radius and hence only slightly along the direction of penetration, radially in relation to the axis of the shaft, that is, when the bars are designed and arrayed in this way, material that penetrates the narrowest point of the grating can settle in the interstices, get wedged in, and hence reduce the free surface of the grating, also increasing the hydraulic resistance. When the material includes rigid objects like rocks, branches, etc., they can, due to the comparatively resilient structure of the bars, get caught between them outside of the narrowest section of the grating, permanently expanding its surface in the vicinity of the objects, to the detriment of reliable precipitation and allowing even larger objects to penetrate at these points. The inner ends of bars in the known device can also be in the form of knives that cut up materials with long fibers. This is another drawback in that the sensitive edges of the knives can be damaged due to the abrasiveness of their contact with the worm. The blades can in particular become bent by hard objects. The wear produced by the worm is accordingly also not negligible. It is particularly detrimental when long fibers are severed because the resulting shorter sections penetrate very readily through the interstices back into the cleaned liquid and do not settle at all.

A similar device, with a slanting shaft and conveyor worm, that is, is known from U.S. Pat. No. 2 929 504. The housing for the worm, however, extends all the way down to the bottom of the channel, and the grating replaces only part of its wall. Since the grating is actually in the form of a sheet of metal with a number of longitudinal slots, the interstices do not extend very far axially and their width is very stable. The risk of the interstices varying in width due to the displacement of the resilient bars is accordingly eliminated. Other drawbacks, however, are associated with a perforated sheet of this type. In particular, a considerable amount of stringing occurs during precipitation, meaning that fibrous material settles and forms strings at the edges of the perforations, preventing the liquid from penetrating. This devcice accordingly does not involve any continuous longitudinal interstices, and the ends of the slots create in conjunction with the rotating worm a shearing or severing mechanism that prevents the worm from conveying all of the precipitation material upward, whereas most of it gets trimmed off and penetrates into the cleaned portion of the liquid.

SUMMARY OF THE INVENTION

The object of the invention is to improve a device of the aforesaid type to the extent that the interstices will reliably remain constant in width and the drawbacks of a severing action will be extensively eliminated, such that precipitation will reliably occur with the grating being constantly cleaned while the hydraulic resistance of the grating is kept low over long periods of operation.

This object is attained in accordance with the invention in that the grating bars are more or less triangular or trapezoidal in cross-section, with rounded-off edges, and positioned in such a way one side of the triangular or trapezoidal cross-section is oriented tangential to the circumference of the conveyor worm, also making the longitudinal interstice narrowest at the least possible radius at that point, adjacent to which its open cross-section expands over-proportionally in the direction traveled by the liquid, and in that the grating bars that demarcate the longitudinal interstice are connected by outside bracing bars. Reinforcing the grating bars with the bracing bars also results in a grid, which is extremely stable. The drawbacks of gratings made out of sheets of metal perforated with longitudinal slots etc. are on the other hand avoided because the interstices always face the worm, eliminating any trimming action. The grating is, in spite of its full-length interstices, very stable and resistant to torsion. The forces generated by the abrasive contact with the worm can accordingly not lead to the disadvantage of deformation. Hard objects entrained with the material being screened out will not get stuck in the interstices, whereas the bars will be positioned and secured so stable that the objects will also be conveyed away along with the precipitated material, whereby the width of the interstices and hence the precepitating and screening action will be maintained constant. One practical aspect of this design is that the narrowest point of the interstice is at the least possible radius and accordingly as near as possible to where it comes into contact with the outer surface of the worm, allowing its scraping action to be completely effective at that point. The cleaning effect is accordingly especially thorough, and the hydraulic resistance of the grating is kept low throughout the operation due to the constantly recurring and highly efficient cleaning action. Even the rounded-off edges are significant in that they prevent severing and trimming in conjunction with the rotating worm. Fibrous or stringy material will on the contrary be drawn around the edges, increasing the precipitation without allowing severing. In spite of the satisfactory precipitation, however, it is impossible to prevent some of the material being screened out from penetrating through the interstices. This material, however, can still not accumulate within the interstices because the cross-section at that point is over-proportional and accordingly larger than what corresponds to the radius from the axis of the shaft. No precipitation will occur outside the narrowest point in a cross-section that expands in this way. Another advantage of the triangular or trapezoidal cross-section of the bars is that it will, more or less in contrast to a rectangular cross-section, whereby the longer sides are oriented radially, be optimally oriented in relation to stress. This type of cross-section also facilitates precise manufacture of the grating in that the points of contact between the grating bars and the bracing bars can be relatively small as is necessary to ensure precise welding. The over-proportional expansion of the cross-section along the direction of flow, radially in relation to the axis of the shaft of the helical conveyor, that is, is also an advantage in that it improves precipitation because a powerful expansion in the open cross-section leads to a powerful reduction in the rate of flow and hence diminishes the risk of fibrous material being released from the narrowest point of the cross-section and escaping into the cleaned portion of the liquid. The device in accordance with the invention can also be employed very practically with channels that are narrow, less than 500 mm wide, wherein there is not enough room to employ rotating gratings with diameters longer than that of the conveyor. The width of the interstices in the device in accordance with the invention can also differ considerably, from approximately 0.25 to 5 mm or more, without violating the principle in accordance with which the device operates.

The cross-section of the grating bars can be symmetrical to the direction that the liquid flows in, in which case they will also be oriented in the same way. The cross-section can for example be an isosceles triangle, with the narrower angle of the cross-section facing outward at its apex.

The bracing bars can also have a triangular or trapezodial cross-sectgion and can be oriented such that the greatest width of the cross-section points outward along the direction that the liquid flows in. The cross-section of the grating bars on the one hand and that of the bracing bars on the other will accordingly be oriented opposite each other, simultaneously resulting in flat components on the inner and outer surfaces of the grating, which is practical in relation to operating in conjunction with the worm and facilitates securing the grating bars to the bracing bars, by welding for example.

The grating bars and bracing bars can have approximately the same cross-section, meaning that the grating can be completely manufactured out of the same stock. It is on the other hand no drawback at all for the two types of bar to differ in cross-section if necessary in order to increase stability in a particular way. It is also important of course for the side of the bracing bars that forces the direction that the liquid flows in to be as narrow as possible to eliminate focuses or edges where the strings can accumulate.

The bracing bars can be distributed around the surface of the cylindrical grating at intervals of ten times the maximum width of the grating bars. This will make the grating look like a grid, whereby however, it will still have longitudinal interstices that are not interrupted at any point along its length. The large number of points of attachment between the grating bars and the bracing bars will provide the grating with a highly precise and well defined shape, especially in the vicinity of the inner surface, which comes into abrasive contact with the outer surface of the worm. This is desirable for and even prerequisite to efficient precipitation The helical conveyor can have a shaft only where it joins the grating at the top, meaning that the shaft is absent in the vicinity of the grating, and the torque is transmitted only by the worm itself at that point. The design is very practical at high flow rates because the shaft would lead to turbulence upstream of where the material is deposited. It also makes space available that would otherwise be occupied by the shaft.

The grating can be made out of grating bars bracing bars and be open at the bottom. The terminal plate that is conventional at that point can also be done without and the otherwise unavoidable gap between the device and the bottom of the channel be avoided. The advantage is that, when there is no terminal plate, the turbulence it causes in the liquid being filtered will also be absent, and the liquid will flow through the grating uniformly and without excessive turbulence. This situation will also promote precipitation.

The bottom of the conveyor worm can project out of the helical conveyor unimpeded and can be supported above the grating by one or more friction-bearing rings. This avoids the necessity of securing the conveyor below the surface of the liquid. The friction-bearing rings can be located above the surface of the liquid, preferably where the diameter of the conveyor is shorter.

The outer circumference of the section of the conveyor worm that comes into contact with the grating bars can be resilient. This measure will compensate for manufacturing tolerances, even though such tolerances will, due to the specific construction of grating bars and bracing bars, already be low, although not completely unavoidable. The resilience will prevent any accumulation in the vicinity of the grating, which will constantly be cleaned by the reliable contact between the worm and the grating, keeping the hydraulic resistance of the grating low.

For this purpose the outer circumference of the conveyor worm can have a strip of bristles, a resilient lip, or a similar structure. These structures will ensure the requisite resilience. It will be obvious that the restoration forces and rates of such resilient structures will be absolutely adequate to ensure constant contact between the rotating worm and the grating or its bars.

Lateral housing-like intake walls can be positioned in the vicinity of the grating. These walls, which are continuous and accordingly closed, will stably secure the grating and provide it with additional stability. They will in particular counteract torsion on the part of the grating and allow a sealing strip to be conventionally constructed and positioned against the wall of the channel.

The conveyor worm, which extends through both the grating and the adjacent conveyor section, can have a longer diameter in the vicinity of the grating than in that of the adjacent conveyor section, and the grating can be positioned at a correspondingly longer diameter than the housing of the helical conveyor. This measure makes the diameter of the grating extensively independent of the diameter of the conveyor section, and the difference in diameters will compact the material in the vicinity of the conveyor section. It will also be possible to make the area of the grating comparatively large when the liquid in the channel is loaded with different levels of material.

BRIEF DESCRIPTION OF THE DRAWINGS

Various embodiments of the invention will now explained and described with reference to the drawing, wherein FIG. 1 is a schematic perspective view of one embodiment of the invention in operation, FIG. 2 is a detail of the area indicated by the circle Z in FIG. 1.

DESCRIPTION OF THE PREFERRED EMBODIMENTS

Figure 3:
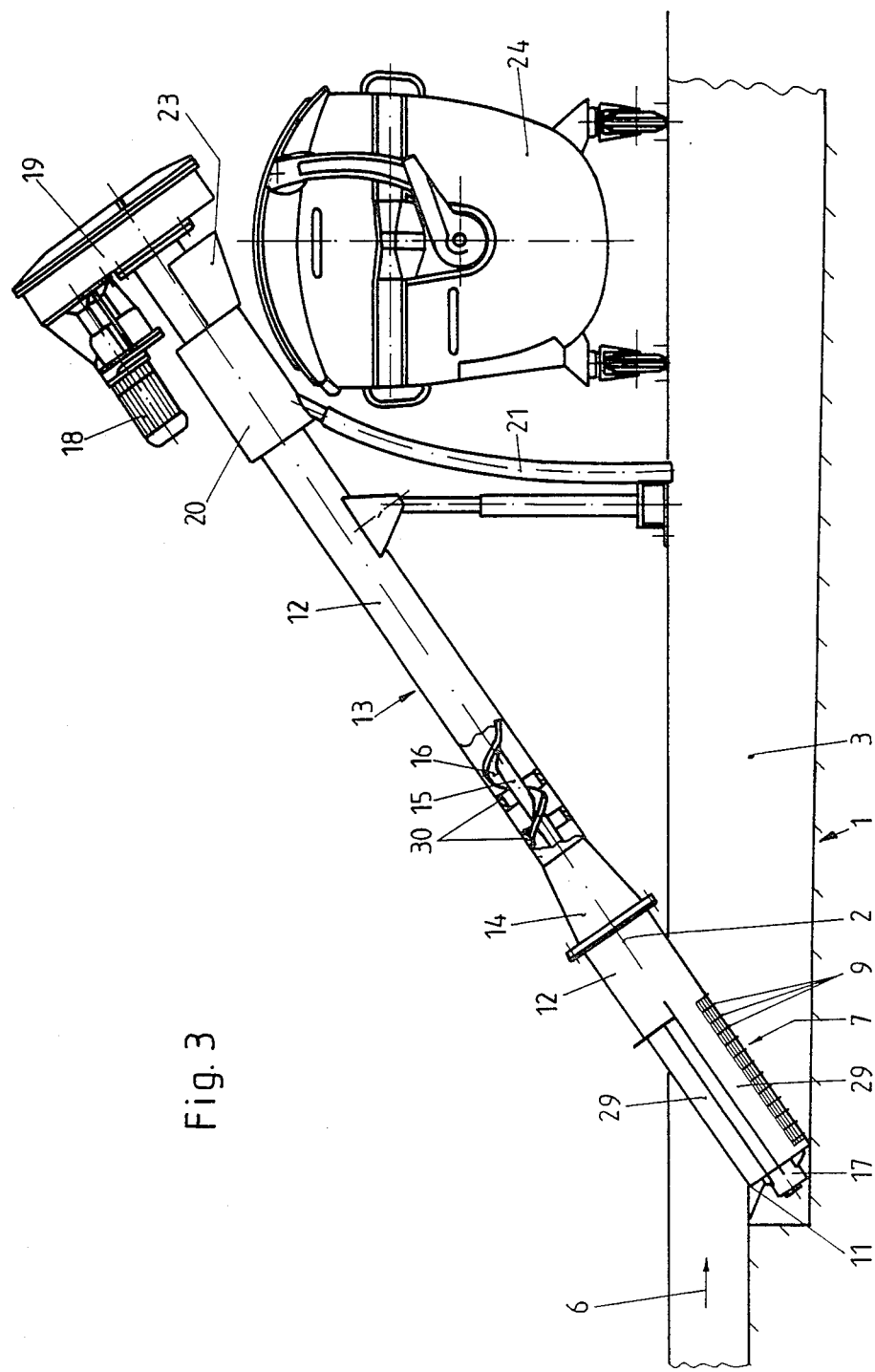
FIG. 3 is a side view of another embodiment of the invention.

The device in FIG. 1 is positioned with its axis 2 slanting, neither horizontal nor vertical, that is, into a schematically illustrated channel 1 in such a way that part of it is in contact with the walls 3 of the channel, which, since it accommodates a higher level 4 of water upstream of the device and a lower level 5 downstream of the device, water flows through in the direction indicated by arrow 6.

At the bottom of the device is a grating 7 that parallels axis 2 at least far enough that the section below water level 4 will remain in the water even though the water level varies. Grating 7 consists essentially of grating bars 8 that are arrayed parallel with axis 2 along the surface of a cylinder, and of bracing bars 9 that extend along a segment of the cylinder at a tangent to the circumference of the cylinder of grating bars 8 and hence perpendicular to axis 2. It will be evident that bracing bars 9 are distributed all the way around the circumference of grating 7 even though the figure does not, for the sake of clarity, completely illustrate the situation.

Bracing bars 9 are located at a longer diameter, as viewed from axis 2 out, than grating bars 8 are, leaving continuous and uninterrupted longitudinal slots 10 that parallel axis 2 between grating bars 8. Grating 7 can have a terminal plate 11 at the bottom to help bracing bars 9 stabilize grating bars 8 and secure them in position.

Sloping up from grating 7 is the cylindrical housing 12 of a helical conveyor 13. Accommodated in housing 12, which can also have a conical section 14, is a shaft 15 that is connected to or supports a conveyor worm 16. Worm 16 extends over the total length of the device, even into the section that accommodates grating 7, where there is no shaft 15 in the embodiment illustrated in FIG. 1 and where conveyor worm 16 has a longer diameter, matching the inside diameter of grating bars 8. The bottom of conveyor worm 16 can be mounted in a bearing 17 in the vicinity of helical conveyor 13. At the top of housing 12 is another, unillustrated, bearing. Also at the top of the housing are a motor 18 and transmission 19, which drive shaft 15 and hence conveyor worm 16. The pitch of conveyor worm 16 does not have to be constant over its total length, and may vary from section to section or, as illustrated, have a compacting section 20 with a narrower pitch at the top. At that section, housing 12 has double walls, with the inner wall having holes to allow the liquid expressed when the material is compacted to escape back into channel 1 through a pipe 21, while the compacted material 22 is ejected through a chute 23 into a receptacle 24.

As will be especially evident from the detail Z in FIG. 2, grating bars 8 are more or less triangular in cross-section, in the form of an isosceles triangle in the present instance, whereby one side 25 of the triangle is at a tangent to the inner circumference of grating 7 with the apex of the triangle extending radially outward from axis 2. This measure results in continuous longitudinal slots 10 between grating bars 8 with narrowest points 26 that, due to the rounded-off edges of the triangular cross-section grating bars 8, are in the vicinity of the inner circumference and accordingly adjacent to triangle sides 25. At this point material 22 will precipitate uniformly against the inner surface of grating 7, whereas the water that penetrates the grating in the direction indicated by arrow 27 will encounter an overproportionally expanding cross-section 28 just downstream of narrowest points 26. This over-proportional expansion, meaning an expansion that is greater than would correspond to the increase in the radius deriving from axis 2 at this point, decelerates the flow in the direction indicated by arrows 27 to such an extent that the liquid cannot suction the precipitated material 22 through longitudinal slots 10. Material 22 actually remains in its precipitated position and is picked up by the outer edge of rotating conveyor worm 16 and removed from the inner surface of grating 7, arriving in the vicinity of housing 12 and hence in that of the conveyor section of helical conveyor 13, finally to be compacted and ejected into receptacle 24. The bracing bars 9 that reinforce and secure grating bars 8 are for the sake of simplicity not illustrated in FIG. 2. They must of course be present because they are essential for stabilizing grating 7, preventing grating bars 8 from buckling when encountered by hard objects in the material being screened out and maintaining the width of longitudinal slots 10 constant. The result is reliable precipitation throughout the operation with no hard objects like stones etc. getting stuck between grating bars 8. Furthermore, the areas of penetration of grating 7 will in this way be kept free.

Figure 4:
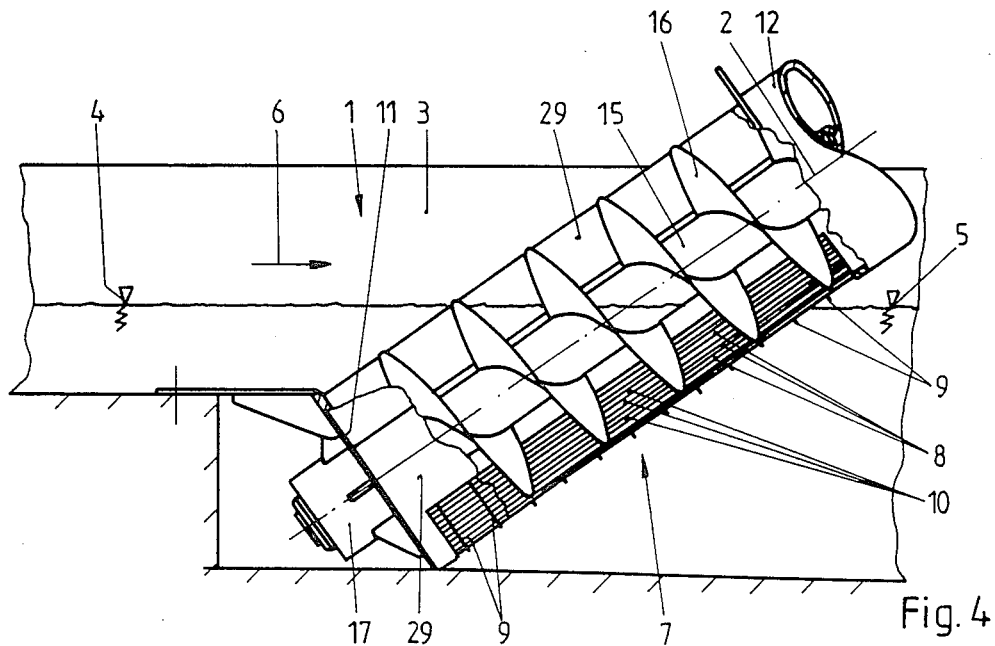
FIG. 4 is a larger-scale view of the grating in the embodiment illustrated in FIG. 3.

The embodiment of the invention illustrated in FIGS. 3 and 4 is similar to the one illustrated in FIGS. 1 and 2, with the exception that shaft 15 is continuous, extending also into the vicinity of grating 7, where it supports conveyor worm 16. It will be obvious from FIG. 4 that bracing bars 9 are positioned at a longer diameter than grating bars 8, so that the position of bracing bars 9 does not interfere with or interrupt the longitudinal slots 10 between grating bars 8. It will be evident from both FIGS. 4 and 3 that grating 7 is surrounded by housing-like intake walls 29, which also help to stabilize the grating. This embodiment as well will function without a lower bearing 17, in which case it is possible to position friction-bearing rings 30 above water level 4 or 5, whereby all the bearings for shaft 15 and conveyor worm 16 will be outside the water. FIGS. 3 and 4 also illustrate the mutual interval between bracing bars 9 in relation to the design and position of grating bars 8.

Figure 5:
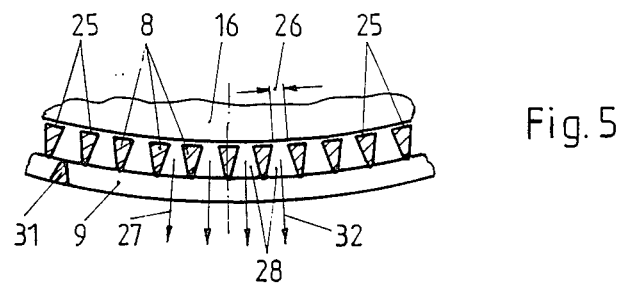
FIG. 5 is a section through the grating perpendicular to the axis of the conveyor shaft.

FIG. 4 also illustrates how bracing bars 9 can also have a more or less triangular or trapezoidal cross-section, oriented, however, opposite to that of grating bars 8. This situation will also be evident from FIG. 5, which is a section more or less perpendicular to axis 2, making the cross-sections and opposite positioning of grating bars 8 and bracing bars 9 particularly clear. One cross-section 31 of bracing bars 9 will now be discussed in particular. The two apexes of the triangular cross-sections face each other, resulting in a relatively small contact surface, so that grating bars 8 and bracing bars 9 can in a practical way be forced together and welded at a large number of points and so that the diameter and the position of triangle sides 25 on the diameter will not be affected. This illustration also shows narrowest point 26 and the adjacent expanding cross-section 28, always in the direction 32 that the liquid flows in, radially in relation to axis 2 or in the direction indicated by arrow 27, that is, very clearly.

Figures 6, 7:
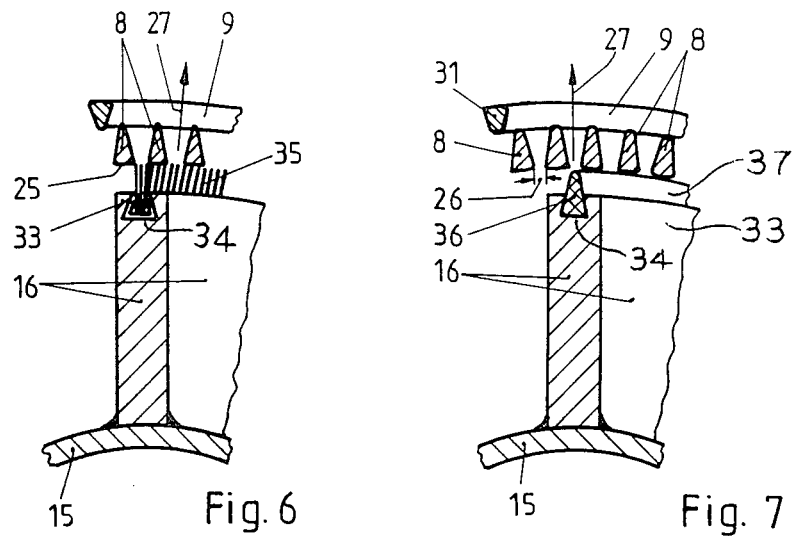
FIG. 6 is a similar section through a grating with a worm that has a resilient circumference.
FIG. 7 illustrates another variation of a resilient worm.

FIGS. 6 and 7 are sections more or less perpendicular to the axis 2 of the device and illustrate how the contact between conveyor worm 16 and grating 7 can be improved even more. Conveyor worm 16 has an outer edge 33 that faces the sides 25 of the triangular cross-section of the grating bars 8 in grating 7. In this area there is in a parctical way a dovetail groove 34 that accommodates a strip 35 of bristles (FIG. 6) or a stripping lip 37 (FIG. 7). Scraping strip 36 is in a practical way a weak but non-wearing strip of plastic structural section. The restoring force of the bristles in strip 35 or the resilience of scraping strip 36 will ensure that the rotating conveyor worm 16 will remain in constant contact with the sides 25 of the triangular cross-section of grating bars 8 and that any material precipitating there will be scraped off and conveyed up, with a grating 7 constantly being cleaned.

I claim:

1. An arrangement for removing material screened or filtered out of a liquid flowing in a channel, comprising: an unpowered cylindrical grating slanting downwardly to the bottom of said channel and being immersed partly in said liquid; said grating having a total length and grating bars extending over said total length, said grating bars having longitudinal interstices between them; screw conveyor means having a housing, a shaft, and a worm for conveying screened-out material to a deposition location, said grating merging into an upward-sloping section comprising said conveyor means; said worm picking up said screened-out material when scraping said bars of said grating and conveying said material upward thereby maintaining said grating clean; said grating bars having a predetermined cross-section with rounded-off edges, said worm having a circumference and positioned relative to said grating bars so that one side of said cross-section is oriented tangential to said circumference; said interstices having a narrowest location at a least possible radius at a predetermined point, said interstices having an open cross-section adjacent to said point and expanding proportionately in a direction flowed by said liquid so that particles which pass through said narrowest location cannot be held by said grating bars for preventing clogging; and outside bracing bars connected to said grating bars, said grating bars defining said longitudinal interstices, said predetermined point being outside of contact with said circumference of said worm to prevent a cutting effect between said worm and said grating bars whereby cutting of long fibers which can pass through the interstices without being separated from said liquid is prevented; said bracing bars maintaining constant interstice widths between said grating bars.

2. An arrangement as defined in claim 1, wherein said cross-section of said grating bars is triangular.

3. An arrangement as defined in claim 1, wherein said cross-section of said grating bars is trapezoidal.

4. An arrangement as defined in claim 1, wherein said bracing bars have a cross-section substantially similar to the cross-section of said grating bars, said bracing bars being oriented so that the cross-section of said bracing bars has a maximum width pointing outward along the direction of flow of said liquid.

5. An arrangement as defined in claim 4, wherein the cross-section of said bracing bars is triangular-shaped.

6. An arrangement as defined in claim 4, wherein the cross-section of said bracing bars is trapezoidal-shaped.

7. An arrangement as defined in claim 1, wherein said bracing bars are distributed around the cylindrical grating surface at intervals of ten times the maximum width of said grating bars.

8. An arrangement as defined in claim 1, wherein said shaft of said screw conveyor means is located only where said shaft joins said grating at the top.

9. An arrangement as defined in claim 1, wherein said grating has an open bottom.

10. An arrangement as defined in claim 9, wherein said worm has a bottom projecting unimpeded out of said screw conveyor means, and at least one friction-bearing ring for supporting the bottom of said worm above said grating.

11. An arrangement as defined in claim 1, wherein said worm has an outer circumference section in contact with said grating bars, said section being resilient.

12. An arrangement as defined in claim 11, wherein said resilient section is a strip of bristles or a resilient lip.

13. An arrangement as defined in claim 1, further including lateral housing-shaped intake walls positioned in vicinity of said grating.

14. An arrangement as defined in claim 1, wherein said worm extends through both side grating and said upward-sloping section of said conveyor means said worm having a longer diameter in vicinity of said grating than in said adjacent upward-sloping conveyor section, said grating being positioned at a corresponding longer diameter than said housing of said conveyor means.

15. An arrangement for removing material screened or filtered out of a liquid flowing in a channel, comprising: an unpowered cylindrical granting slanting downwardly to the bottom of said channel and being immersed partly in said liquid; said grating having a totat length and grating bars extending over said total length, said grating bars having longitudinal interstices between them; screw conveyor means having a housing, a shaft, and a worm for conveying screened-out material to a deposition location, said grating merging into an upward-sloping section comprising said conveyor means; said worm picking up said screened-out material when scraping said bars of said grating and conveying said material upward thereby maintaining said grating clean; said grating bars having predetermined cross-section with rounded-off edges, said worm having a circumference and positioned relative to said grating bars so that one side of said cross-section is oriented tangential to said circumference; said interstices having a narrowest location at a least possible radius at a predetermined point, said interstices having an open cross-section adjacent to said point and expanding proportionately in a direction flowed by said liquid so that particles which pass through said narrowest location cannot be held by said grating bars for preventing clogging; and outside bracing bars connected to said grating bars, said grating bars defining said longitudinal interstices, said predetermined point being outside of contact with said circumference of said worm to prevent a cutting effect between said worm and said grating bars whereby cutting of long fibers which can pass through the interstices without being separated from said liquid is prevented; said bracing bars maintaining constant interstice widths between said grating bars; said bracing bars having a cross-section oriented so that said cross-section has a greatest width pointing outward along the direction of flow of said liquid; said bracing bars being distributed around the cylindrical grating surface at intervals of ten times the maximum width of said grating bars; said shaft of screw conveyor means being located only where said shaft joins said grating at the top; said grating being open at the bottom of said grating; said worm having a bottom projecting unimpeded out of said screw conveyor means, and at least one friction-bearing ring for supporting the bottom of said worm above said grating; lateral housing-shaped intake walls positioned in vicinity of said grating; said worm extending through both said grating and said upward-sloping conveyor section, said worm having a longer diameter in vicinity of grating than in said upward-sloping conveyor section; said grating being positioned at a correspondingly longer diameter than said housing of said conveyor means.

* * * * *